Patented May 3, 1927.

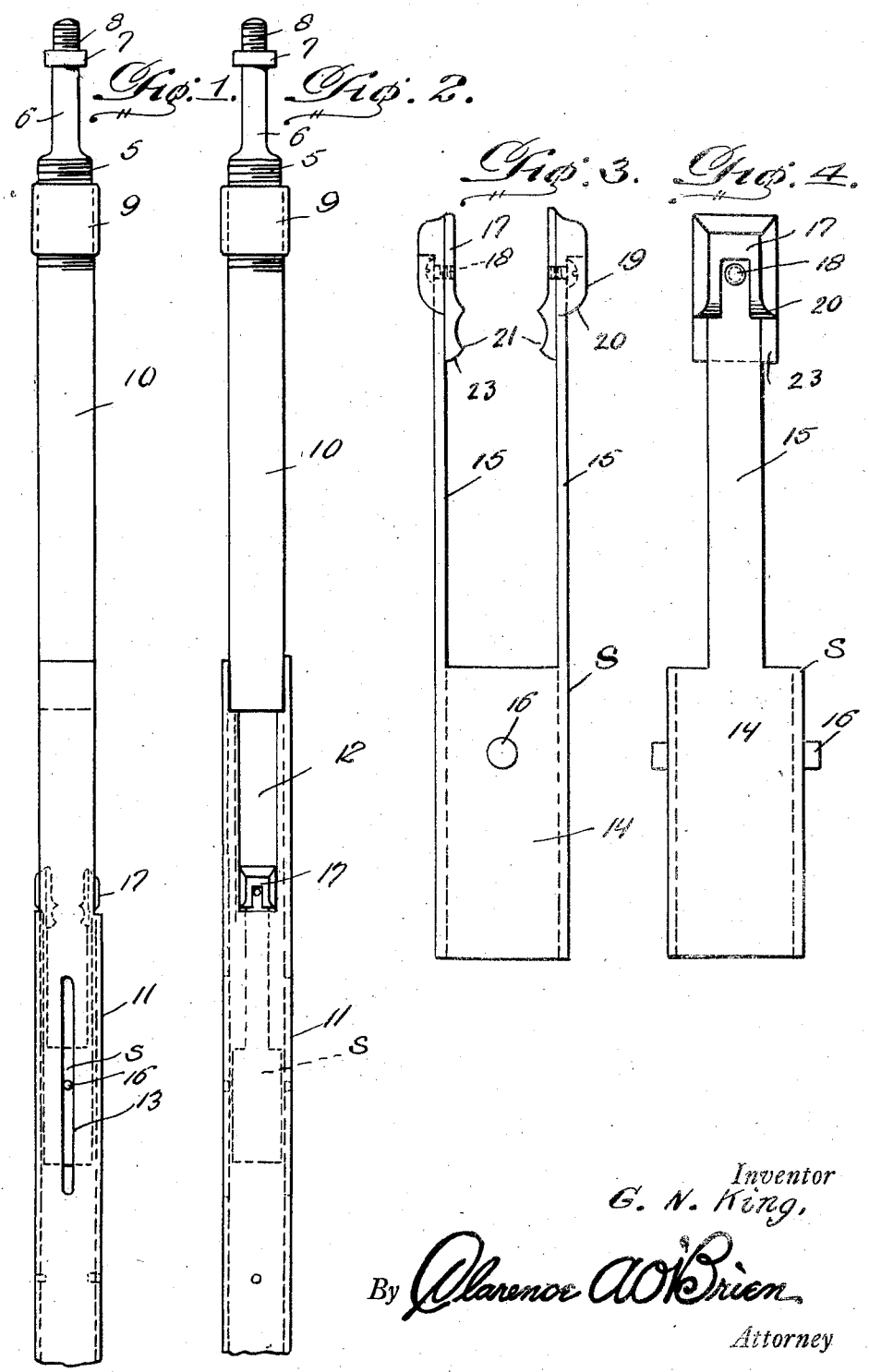

1,626,843

UNITED STATES PATENT OFFICE.

GROVER NEGLEY KING, OF KERRVILLE, TEXAS.

FISHING TOOL.

Application filed March 13, 1926. Serial No. 94,486.

The present invention relates to a fishing tool and aims to provide a structure for recovering broken plunger parts, drills, and the like from deep wells.

Another important object of the invention is the provision of a fishing tool of this nature which is exceedingly simple in its construction, strong and durable, efficient and reliable in use, not likely to easily become out of order, and otherwise well adapted to the purpose for which it is designed.

The objects above, together with the other objects and corresponding accomplishments, are obtained by the means of the embodiment of my invention illustrated in the accompanying drawings, in which:—

Figure 1 is an elevation of the fishing tool embodying the features of my invention, Fig. 2 is another elevation thereof taken at right angles to that shown in Fig. 1, Fig. 3 is an elevation of the movable portion of the tool, and Fig. 4 is another elevation thereof taken at right angles to that shown in Fig. 3.

Referring to the drawing detail, it will be seen that 5 indicates an externally threaded body, having at its upper end a shank 6 provided with a wrench hold 7 and male member 8 of a tool joint. Mounted on the body 5 is a sleeve 9 for threadedly engaging a pipe section 10. A pipe section 11 has its upper portion bifurcated for forming slots 12. The upper ends of the bifurcations straddle the lower end of the pipe section 10 and are welded or otherwise fixed securely thereto. The pipe section 11 is provided with a pair of longitudinally extending openings 13.

A slip member S is slidable in the section 11 and includes a cylindrical portion 14 having a pair of spring arms 15 extending from one edge thereof in normal spaced parallelism. Lugs 16 project outwardly and laterally from the cylindrical portion 14, and project through the openings 13. A dog 17 is fixed to the upper end of each arm 15, by means of a screw 18 or the like.

The dogs have their backs 19 provided with lower curved ends 20 while their faces are provided with teeth 21. Normally when the slip member S is in the section 11, as is clearly illustrated in Figs. 1 and 2, the curved ends 20 rest on the bottom edges of the slots 12. When the tool is lowered down in the well so that a plunger passes upwardly into the section 11, it will engage one or both of the lower edges of the face portions of the dogs, thereby lifting the slip member upwardly until the lugs 16 abut the upper edge of the opening 13.

It is to be noted that the lower edge of the face portions of the dogs is rounded as is indicated at 23 so that when the member S is stopped as just indicated, the further downward movement of the coupling as a whole will spring the arms 15 apart so that the dogs will extend outwardly through the slots 12. When the coupling is raised, it will be seen that the slip member will move downwardly and the curved bottom edges 20 will engage the bottoms of the openings 13, thereby forcing the shoes toward each other to obtain a biting grip upon the coupling.

It is thought that the invention will now be clearly understood without a more detailed description thereof. The present embodiment of the invention has been disclosed in detail merely by way of example, since in actual practice it attains the features of advantage enumerated as desirable in the statement of the invention and the above description.

It is apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

A fishing tool of the class described including a hollow grab head having a pair of longitudinally disposed slots, a slit member slidable in the grab head and comprising a cylindrical portion, and a pair of arms of spring material rising from the upper edge thereof, means for limiting the movement of the slit member in the grab head, and holding the cylinder so that the arms are in a position to move through the slots, a pair of dogs one on the upper terminal of each arm, the inner faces of said dogs being provided with teeth, and the lower edges both at their inner and outer faces being curved upwardly and outwardly.

In testimony whereof I affix my signature.

GROVER NEGLEY KING.